US011333093B2

United States Patent
Plogmann et al.

(10) Patent No.: US 11,333,093 B2
(45) Date of Patent: May 17, 2022

(54) METHOD AND DEVICE FOR CONTROLLING A HEATING ELEMENT FOR HEATING A SENSOR ELEMENT OF A MASS AIR-FLOW SENSOR FOR A VEHICLE AND MASS AIR-FLOW SENSOR SYSTEM FOR A VEHICLE

(71) Applicant: Robert Bosch GmbH, Stuttgart (DE)

(72) Inventors: Benjamin Plogmann, Rosswaelden (DE); Thomas Schwartzkopff, Ditzingen (DE)

(73) Assignee: Robert Bosch GmbH, Stuttgart (DE)

( * ) Notice: Subject to any disclaimer, the term of this patent is extended or adjusted under 35 U.S.C. 154(b) by 48 days.

(21) Appl. No.: 16/647,893

(22) PCT Filed: Aug. 22, 2018

(86) PCT No.: PCT/EP2018/072618
§ 371 (c)(1),
(2) Date: Mar. 17, 2020

(87) PCT Pub. No.: WO2019/057428
PCT Pub. Date: Mar. 28, 2019

(65) Prior Publication Data
US 2020/0263623 A1 Aug. 20, 2020

(30) Foreign Application Priority Data

Sep. 20, 2017 (DE) .......................... 102017216656.8

(51) Int. Cl.
*F02D 41/14* (2006.01)
*F02D 41/18* (2006.01)
(Continued)

(52) U.S. Cl.
CPC ....... *F02D 41/1494* (2013.01); *F02D 41/187* (2013.01); *F02D 41/222* (2013.01); *G01F 1/699* (2013.01); *G01F 1/6983* (2013.01)

(58) Field of Classification Search
CPC .. F02D 41/1494; F02D 41/187; F02D 41/222; F02D 41/18; G01F 1/6983; G01F 1/699; G01F 1/6845; Y02T 10/40
See application file for complete search history.

(56) References Cited

U.S. PATENT DOCUMENTS

| 4,579,462 A | * | 4/1986 | Rall | ........................ G01N 25/68 |
| | | | | 374/16 |
| 6,845,660 B2 | * | 1/2005 | Hecht | ..................... G01F 1/699 |
| | | | | 73/204.17 |

(Continued)

FOREIGN PATENT DOCUMENTS

| CN | 104101625 A | 10/2014 |
| DE | 102005061550 A1 | 7/2007 |

OTHER PUBLICATIONS

International Search Report dated Dec. 4, 2018 of the corresponding International Application PCT/EP2018/072618 filed Aug. 22, 2018.

*Primary Examiner* — Freddie Kirkland, III
(74) *Attorney, Agent, or Firm* — Norton Rose Fulbright US LLP; Gerard Messina

(57) ABSTRACT

With respect to a vehicle mass air-flow sensor that includes a temperature sensor for measuring a temperature of a sensor element of the mass air-flow sensor, a method for controlling a heating element for heating the sensor element of a mass air-flow sensor includes identifying a dew formation on the sensor element by evaluating a temperature profile that is recorded during an operation of the vehicle using the temperature sensor, and generating a switch-on signal for (Continued)

switching on the heating element in response to the identification of the dew formation.

12 Claims, 4 Drawing Sheets

(51) Int. Cl.
    *F02D 41/22*     (2006.01)
    *G01F 1/698*     (2006.01)
    *G01F 1/699*     (2006.01)

(56) References Cited

U.S. PATENT DOCUMENTS

| | | | | |
|---|---|---|---|---|
| 7,693,647 B2* | 4/2010 | Suzuki | ............... | G01F 1/696 |
| | | | | 701/113 |
| 7,980,126 B2* | 7/2011 | Opitz | ............... | G01F 1/6983 |
| | | | | 73/204.26 |
| 8,050,847 B2 | 11/2011 | Losing et al. | | |
| 8,215,160 B2* | 7/2012 | Saito | ............... | G01F 1/6842 |
| | | | | 73/114.34 |
| 8,479,494 B2* | 7/2013 | Enomoto | ............... | F02D 41/1494 |
| | | | | 60/276 |
| 9,970,396 B2* | 5/2018 | Hoshika | ............... | G01M 15/042 |
| 10,031,029 B2* | 7/2018 | Reischl | ............... | G01K 1/08 |
| 10,156,213 B2* | 12/2018 | Pursifull | ............... | G01N 27/223 |
| 10,844,802 B2* | 11/2020 | Won | ............... | F02D 41/18 |
| 10,914,223 B1* | 2/2021 | Axe | ............... | F01N 11/007 |
| 2008/0196487 A1* | 8/2008 | Suzuki | ............... | G01F 1/692 |
| | | | | 73/114.34 |
| 2009/0205417 A1* | 8/2009 | Opitz | ............... | G01F 1/6983 |
| | | | | 73/204.26 |
| 2010/0192671 A1* | 8/2010 | Losing | ............... | G01F 1/6983 |
| | | | | 73/23.31 |
| 2010/0300068 A1* | 12/2010 | Enomoto | ............... | F02D 41/1494 |
| | | | | 60/273 |
| 2011/0072894 A1* | 3/2011 | Saito | ............... | G01F 15/02 |
| | | | | 73/114.34 |
| 2019/0195159 A1* | 6/2019 | Won | ............... | F02D 41/222 |
| 2020/0340866 A1* | 10/2020 | Khaled | ............... | F01N 9/00 |

* cited by examiner

METHOD AND DEVICE FOR CONTROLLING A HEATING ELEMENT FOR HEATING A SENSOR ELEMENT OF A MASS AIR-FLOW SENSOR FOR A VEHICLE AND MASS AIR-FLOW SENSOR SYSTEM FOR A VEHICLE

CROSS-REFERENCE TO RELATED APPLICATIONS

The present application is the national stage of International Pat. App. No. PCT/EP2018/072618 filed Aug. 22, 2018, and claims priority under 35 U.S.C. § 119 to DE 10 2017 216 656.8, filed in the Federal Republic of Germany on Sep. 20, 2017, the content of each of which are incorporated herein by reference in their entireties.

FIELD OF THE INVENTION

The present invention is directed to a device, method, and a computer program for controlling a heating element to heat a sensor element of a mass air-flow sensor of a vehicle.

BACKGROUND

A mass air-flow meter can be connected downstream from an air filter in an air system of a vehicle in order to carry out an exact determination of a mass air-flow. Measuring elements normally used are micromechanical, silicon-based sensor elements. In certain operating states, it can happen that dew forms on the sensor element, which can result in erroneous measurements.

SUMMARY

Against this background, example embodiments of the present invention are directed to a method for controlling a heating element for heating a sensor element of a mass air-flow sensor for a vehicle, a device that uses this method, a mass air-flow sensor system for a vehicle, and a corresponding computer.

According to an example embodiment, a method controls a heating element for heating a sensor element of a mass air-flow sensor for a vehicle, the mass air-flow sensor including a temperature sensor for measuring a temperature of the sensor element, the method including the following steps:
  evaluating a temperature profile recorded during an operation of the vehicle using the temperature sensor, in order to identify a dew formation on the sensor element; and
  generating a switch-on signal for switching on the heating element in response to the identification of the dew formation.

A heating element can be understood to mean, for example, a chip heater, for example, in the form of a resistance heater. A sensor element can be understood to mean, for example, a micromechanical sensor element for measuring a mass air-flow. A mass air-flow sensor can be understood to mean, for example, a hot film mass air-flow meter or hot wire mass air-flow meter placed in the intake system of a diesel engine or gasoline engine of the vehicle. A temperature profile can be a temperature curve for the time-related representation of a temperature change of the sensor element. The temperature profile can, for example, be recorded by the temperature sensor during start-up of the vehicle, in particular, when starting the engine of the vehicle.

The temperature profile can, in particular, have been recorded during the suction of air into an air system of the vehicle. A dew formation can be understood to mean a deposit of condensate on a surface of the sensor element, for example, as the result of fluctuations of an ambient temperature. For example, the profile of the slope of the temperature profile can be compared during evaluation using at least one suitable evaluation parameter such as, for example, a reference profile, a temperature threshold value, or an absolute temperature value, in order to identify the dew formation as a function of a result of this comparison.

The approach presented herein is based on a finding that a chip heater for heating a sensor element of a mass air-flow sensor based on a temperature profile of the sensor element ascertained during a measuring operation can be activated in such a way that dew formation on the sensor element can be prevented by timely heating of the sensor element.

Erroneous measurements can be effectively avoided as a result of such an algorithm-based condensation protection.

According to an example embodiment, a slope of the temperature profile can be ascertained in the step of evaluating, in order to identify the dew formation based on the slope. In this way, the dew formation can be reliably identified.

According to another example embodiment, a comparison can be made in the step of evaluating the slope of the temperature profile using at least one threshold value, at least one absolute value representing an absolute temperature, at least one reference profile, or using a combination of at least two of the aforementioned evaluation parameters, in order to identify the dew formation. A reference profile can be understood to mean, for example, a temperature jump of the sensor element as the ambient temperature increases, but with no dew formation on the sensor element. In this way, it is possible to identify the dew formation sufficiently accurately with comparatively little computing effort.

It is further advantageous if the dew formation is identified in the step of evaluating when the temperature profile exhibits a steeper slope than the reference profile in a predefined evaluation time period. In this way, it is possible to particularly easily and reliably identify the dew formation.

In addition, a temperature profile recorded using the temperature sensor in response to the start of an engine of the vehicle or during operation can be evaluated in the step of evaluating. In this way, it is possible to identify the dew formation when starting the engine and thus a subsequent malfunction of the sensor element can be prevented at an early stage.

In the step of generating, it is possible to generate the switch-on signal in order to switch on the heating element during the operation of the vehicle. In this way, it is possible to prevent the dew formation during the operation of the vehicle, i.e., while the engine is running.

The method can include a step of recording the temperature profile by filtering a temperature signal generated by the temperature sensor during the operation of the vehicle and representing the temperature of the sensor. In this case, the temperature signal can, in particular, be low-pass filtered. In this way, it is possible to reduce measuring inaccuracies.

In addition, a switch-off signal for switching off the heating element after the end of a predefined switch-on period, during which the heating element is switched on, can be generated in the step of generating. In this way, it is possible to prevent an excessive thermal loading of the sensor element.

According to an example embodiment, the switch-on period can be determined in a step of determining as a function of a mass air-flow measured by the sensor element, of an initial temperature of the sensor element measured by the temperature sensor, of an instantaneous temperature of the sensor element measured by the temperature sensor, or of a combination of at least two of the aforementioned measured variables. With this example embodiment, it is possible to significantly increase the accuracy of the method as well as the robustness of the method with respect to ambient influences.

This method can, for example, be implemented in software or in hardware or in a mixed form of software and hardware, for example, in a control unit.

An example embodiment of the present invention is directed to a device designed to carry out, activate, or implement the steps of a variant of a method presented herein in corresponding units by which it is possible to quickly and efficiently achieve the object underlying the present invention.

For this purpose, the device can include at least one processing unit for processing signals or data, at least one memory unit for storing signals or data, at least one interface to a sensor or to an actuator for reading in sensor signals from the sensor or for outputting data signals or control signals to the actuator, and/or at least one communication interface for reading in or outputting data embedded in a communication protocol. The processing unit can, for example, be a signal processor, a microcontroller, or the like, and the memory unit can be a flash memory, an EPROM, or a magnetic memory unit. The communication interface can be designed wirelessly and/or hardwired to read in or output data. The communication interface can read in or output the hardwired data, is capable of reading in these data, for example, electrically or visually from a corresponding data transmission line, or is capable of outputting these data into a corresponding data transmission line.

A device in the present case can be understood to mean an electrical device that processes sensor signals and outputs control signals and/or data signals as a function thereof. The device can include an interface designed in hardware and/or in software. In a hardware design, the interfaces can, for example, be part of a so-called system ASIC that contains a wide variety of functions of the device. It is also possible, however, for the interfaces to be dedicated integrated circuits or to be made up at least partly of discrete components. In a software design, the interfaces can be software modules that are present, for example, on a microcontroller alongside other software modules.

In an example embodiment, the vehicle is controlled by the device. For this purpose, the device can access sensor signals such as acceleration signals, pressure signals, steering angle signals, or surroundings sensor signals. The activation takes place via actuators such as brake actuators, steering actuators, or via an engine control unit of the vehicle.

According to an example embodiment of the present invention, a mass air-flow sensor system for a vehicle includes:
- a mass air-flow sensor including a sensor element for measuring a mass air-flow, a temperature sensor for measuring a temperature of the sensor element, and a heating element for heating the sensor element; and
- a device according as described above.

An example embodiment of the present invention is directed to a computer program product or a computer program having program code that can be stored on a machine-readable medium or memory medium, such as a semiconductor memory, a hard disk memory, or an optical memory, and that is used for carrying out, implementing, and/or activating the steps of the method as described herein, in particular, when the program product or program is executed on a computer or a device.

Example embodiments of the present invention are depicted in the drawings and explained in greater detail in the following description.

DETAILED DESCRIPTION

Figure 1:
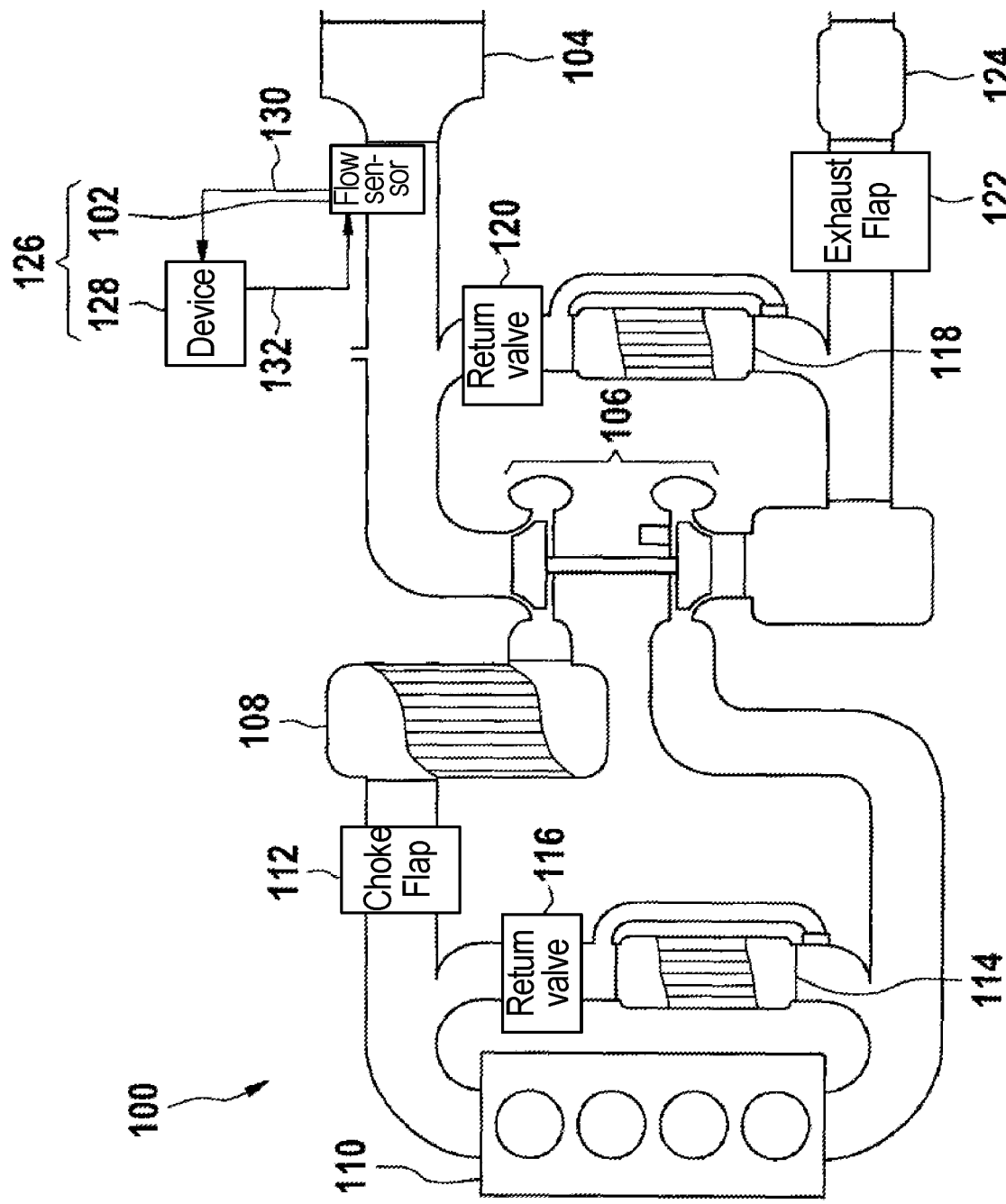
FIG. 1 schematically shows a representation of a vehicle air system including a mass air-flow sensor according to an example embodiment of the present invention.

In the following description of preferred example embodiments of the present invention, identical or similar reference numerals are used for elements which are represented in the various figures and act similarly, a repeated description of these elements being omitted.

FIG. 1 schematically shows a representation of a vehicle air system 100 including a mass air-flow sensor 102 according to an example embodiment of the present invention. Vehicle air system 100 includes an air filter 104 through which air is sucked into vehicle air system 100. Mass air-flow sensor 102, implemented here by way of example as a hot film mass air-flow meter, is connected downstream from air filter 104 and is designed to detect a mass air-flow sucked in via air filter 104. The mass air-flow is compressed via a compressor of a variable turbine geometry charger 106, from where it passes into a charge air-air cooler 108. Charge air-air cooler 108 is connected on the output side to an air inlet of an engine 110 of the vehicle. A choke flap 112 is designed to control the mass air-flow exiting charge air-air cooler 108. An air outlet of engine 110 is couplable to the air inlet via an exhaust gas return cooler 114 including an exhaust gas return valve 116 connected downstream thereof. The exhaust gases discharged by engine 110 arrive back at variable turbine geometry charger 106, where they drive a turbine that is seated on the same shaft as the compressor, and thus drive the compressor. An additional exhaust gas return cooler 118 and an additional exhaust gas return valve 120 connected downstream thereof are used for returning the exhaust gas between a turbine side and a compressor side of variable turbine geometry charger 106. A portion of the exhaust gases not returned enters an exhaust system 124 of the vehicle via an exhaust flap 122.

Mass air-flow sensor 102 is part of a mass air-flow sensor system 126, including a device 128, which is coupled to mass air-flow sensor 102 in order to evaluate a temperature signal 130 recorded by mass air-flow sensor 102 during an operation of the vehicle, the signal 130 representing a profile of a temperature of a sensor element of mass flow air sensor 102, and to activate a chip heater for heating the sensor element as a function of the evaluation. Device 128 provides a corresponding switch-on signal 132 for switching on the chip heater. With such an activation of the chip heater, it is possible to reliably prevent dew formation on the sensor element.

According to an example embodiment, device 128 is designed to activate the chip heater when the vehicle is parked. Thus, oil condensate is prevented from depositing on the sensor element. In this case, therefore, no mass air-flow signal representing the mass air-flow is supplied to a control unit of the vehicle. Device 128 is used, in particular, primarily for activating the chip heater during a normal operation in order to heat the sensor element in a suitable manner during the normal operation. This has two affects as follows. First, a dew point temperature on the sensor element is more rapidly exceeded as a result, which prevents dew from forming on the sensor element. Second, this results in the greatest portion of the dew formation taking place on the surrounding surfaces of the sensor, which are colder than the sensor element.

Condensation generally sets in when the surface of the sensor element, which is implemented, for example, as a plug-in sensor, is colder than the passing air and the dew point of the surface is below the dew point of the circulating air. This occurs, for example, when a change of surroundings takes place from a cool to a warm, humid surroundings. Once dew formation sets in on the sensor element, a large amount of energy is freed up as a result of the phase transition of the water from gaseous to liquid. The result of this energy is that a temperature sensor mounted on the sensor element heats significantly faster than when no dew formation occurs. It is then possible via a suitable evaluation of a temperature gradient using device 128 to reliably distinguish the state of dew formation from the state of a simple jump in temperature. An algorithm used in this case should be rapid enough in order to activate the chip heater so rapidly that still no appreciable measuring errors occur due to dew formation.

According to an example embodiment, the identification algorithm includes the following sequence:
1. the temperature of the sensor element is continuously measured;
2. a filtering optionally takes place, for example, a low-pass filtering, of temperature signal 130;
3. a gradient is calculated on the basis of temperature signal 130;
4. the gradient is assessed, for example, via a definable threshold value or via a combination of multiple suitable parameters such as, for example, of threshold value and absolute temperature;
5. the chip heater is switched on as a function of the assessment of the gradient; and
6. the chip heater is finally switched off again after a defined switch-on period.

The chip heater is switched off, for example, by specifying a fixed time via a simple time control or also via a time control, in which the switch-on period is determined from various parameters such as, for example, instantaneous air mass, initial temperature of the sensor element, instantaneous temperature of the sensor element, or a combination of at least two of the aforementioned variables.

Figure 2:
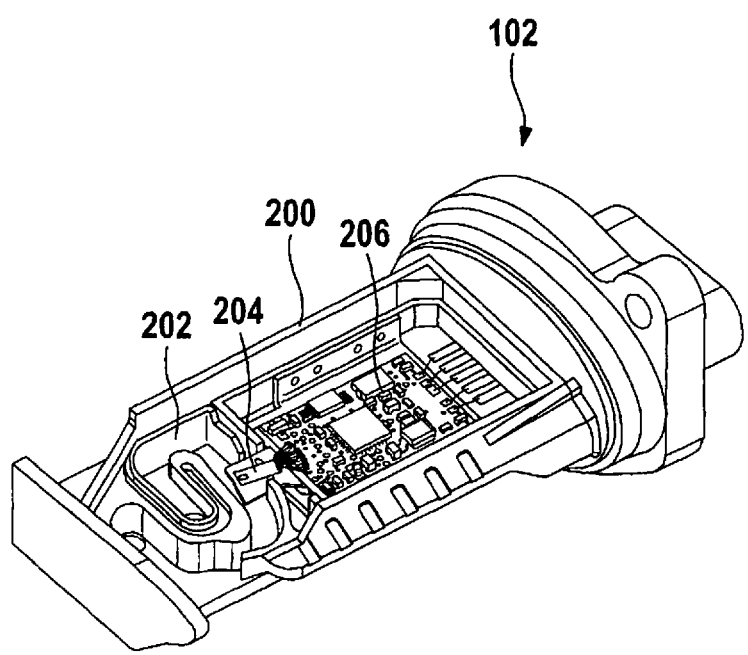
FIG. 2 schematically shows a representation of a mass air-flow sensor from FIG. 1, according to an example embodiment of the present invention.

FIG. 2 schematically shows a representation of a mass air-flow sensor 102 from FIG. 1. Mass air-flow sensor 102 is implemented as a plug-in sensor and includes a sensor housing 200 having a by-pass channel 202 for guiding air to a micromechanical sensor element 204 for detecting the mass air flow and an electronic module 206 for signal processing.

Figure 3:
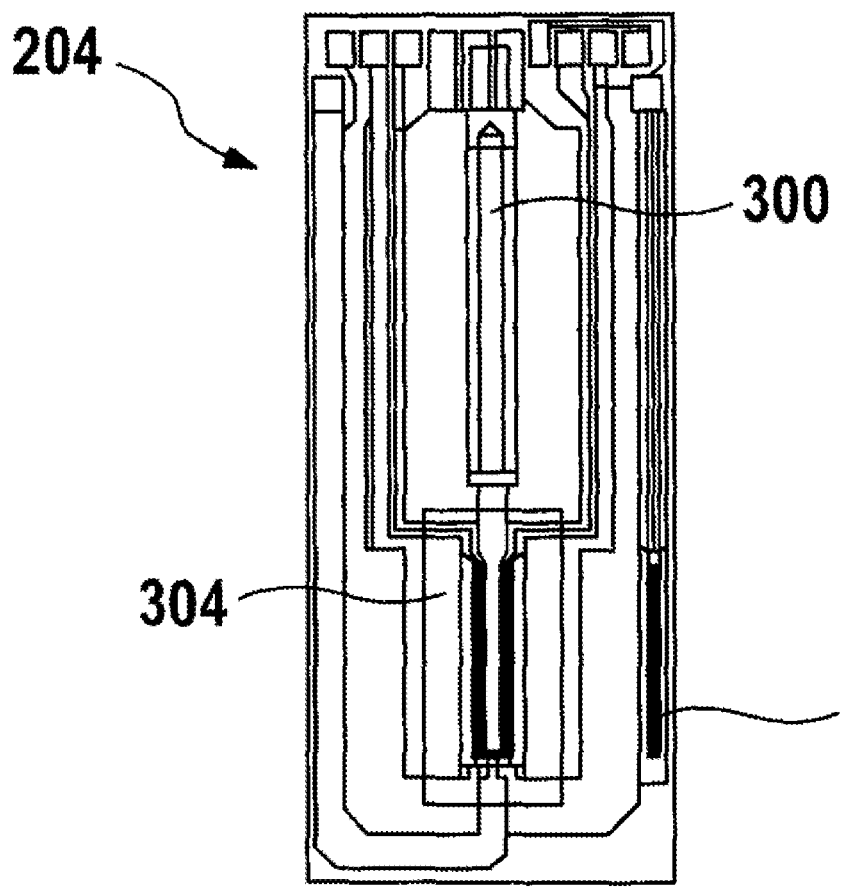
FIG. 3 schematically shows a representation of a sensor element from FIG. 2, according to an example embodiment of the present invention.

FIG. 3 schematically shows a representation of a sensor element 204 of a mass air-flow sensor from FIG. 2. A heating element 300 thermally coupled to sensor element 204 is shown, which functions as a chip heater for heating sensor element 204, for example, in order to prevent oil condensate on sensor element 204, a temperature sensor 302 for detecting the temperature of sensor element 204, as well as a sensor diaphragm 304 of sensor element 204.

Figure 4:
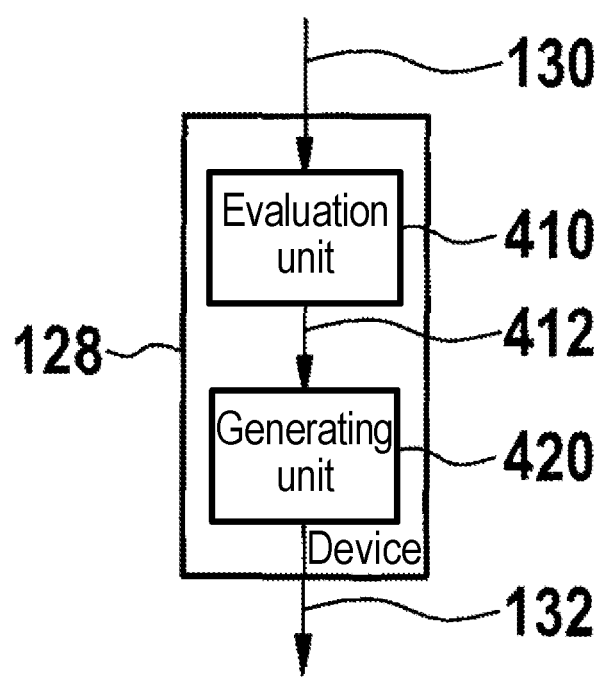
FIG. 4 schematically shows a representation of a device according to an example embodiment of the present invention.

FIG. 4 schematically shows a representation of a device 128 according to an example embodiment, for example, of a device previously described with reference to FIGS. 1-3. Device 128 includes an evaluation unit 410 for evaluating the temperature profile recorded using the temperature sensor during the operation of the vehicle based on temperature signal 130. A generating unit 420 is designed to generate switch-on signal 132 for switching on the heating element using a result value 412 generated by evaluation unit 410. Generating unit 420 generates switch-on signal 132, for example, when result value 412 represents an identified beginning or imminent dew formation on the sensor element.

Figure 5:
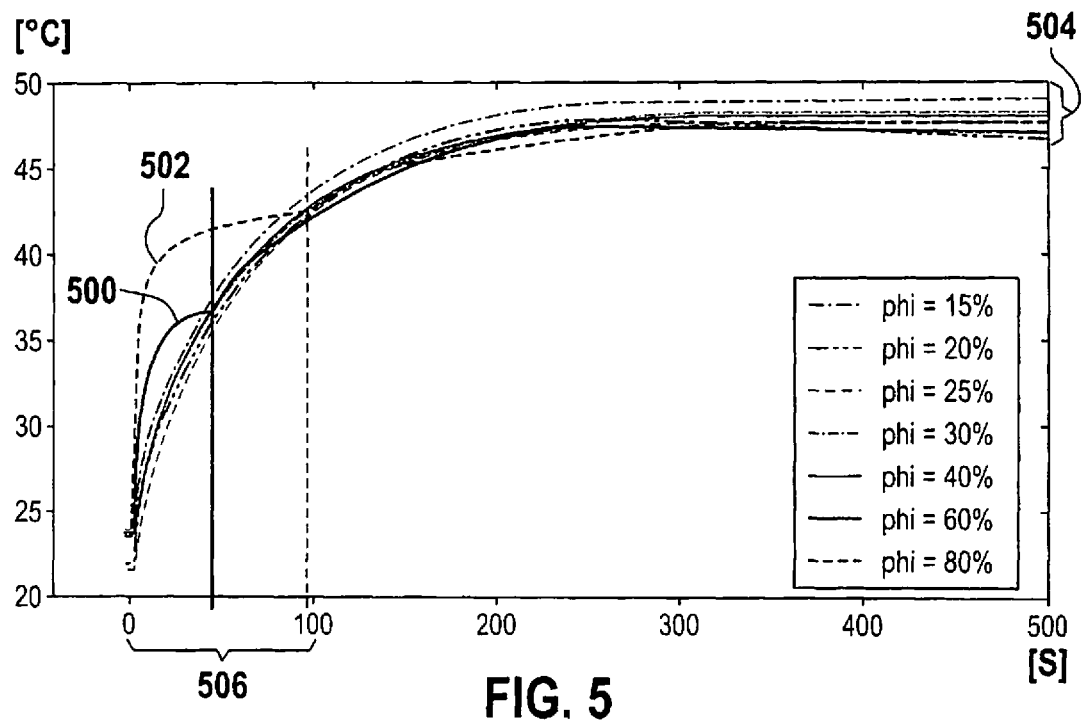
FIG. 5 shows a diagram for illustrating temperature profiles for evaluation using a device according to an example embodiment of the present invention.

FIG. 5 shows a diagram for depicting temperature profiles for evaluating using a device according to an example embodiment, for example, using a device described previously with reference to FIGS. 1-4. FIG. 5 shows, by way of example, a first curve 500 representing a temperature profile of the sensor element at a relative air humidity of 60 percent, a second curve 502 representing a temperature profile of the sensor element at a relative air humidity of 80 percent, and a plurality of additional curves 504 representing temperature profiles of the sensor element detected at a relative air humidity of 15, 20, 25, 30 and 40 percent. All curves 500, 502, 504 have an ambient temperature of 20 degrees Celsius as the starting point. This starting point represents a point in time, for example, at which the engine of the vehicle is started.

Curves 500, 502 each exhibits a significantly steeper slope within an evaluation period 506, during which the temperature profiles are evaluated by the device, as compared to curves 504. Based on this significantly steeper slope, it is possible to deduce an incipient dew formation on the sensor element. Curves 504 function in this sense as reference profiles for identifying the dew formation based on the respective slope of the temperature profiles.

Evaluation period 506 is, for example, between 20 and 100 seconds.

Figure 6:
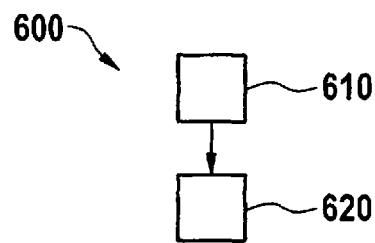
FIG. 6 is a flowchart that illustrates a method according to an example embodiment of the present invention.

FIG. 6 is a flowchart of a method 600 according to an example embodiment. Method 600 for controlling a heating element for heating a sensor element of a mass air-flow sensor for a vehicle can, for example, be carried out by a device previously described with reference to FIGS. 1-5. In a step 610, the temperature profile of the sensor element recorded using the temperature sensor during the operation of the vehicle is evaluated in order to identify the dew formation on the sensor element. In a further step 620, the switch-on signal for switching on the heating element is generated in response to the identification of the dew formation.

The steps 610, 620 can be continuously carried out, in particular, during an operation of the vehicle with the engine running.

If an example embodiment includes an "and/or" linkage between a first feature and a second feature, this is to be read in the sense that the example embodiment according to an example embodiment includes both the first feature and the second feature, and according to other example embodiments, either only the first feature or only the second feature.

What is claimed is:

1. A method for controlling a heating element to heat a sensor element of a mass air-flow sensor of a vehicle, the mass air-flow sensor including a temperature sensor for measuring a temperature of the sensor element, the method comprising:
evaluating a temperature profile recorded during an operation of the vehicle using the temperature sensor to identify a dew formation on the sensor element; and
generating a switch-on signal to switch on the heating element in response to the identification of the dew formation,
wherein the evaluating includes ascertaining a slope of the temperature profile, the dew formation being identified based on the slope.

2. The method of claim 1, wherein the evaluating includes identifying the dew formation by comparing the temperature profile to at least one threshold value, at least one absolute value representing an absolute temperature, and/or at least one reference profile.

3. The method of claim 1, wherein the evaluating includes identifying the dew formation in response to the temperature profile exhibiting a slope in a predefined evaluation time period that is steeper than a reference profile.

4. The method of claim 1, wherein the evaluating includes evaluating a temperature profile recorded using the temperature sensor in response to a start of an engine of the vehicle.

5. The method of claim 1, wherein the generated switch-on signal switches-on the heating element during the operation of the vehicle.

6. The method of claim 1, further comprising:
recording the temperature profile by filtering a temperature signal that is generated by the temperature sensor during the operation of the vehicle and that represents the temperature of the sensor element.

7. The method of claim 6, wherein the temperature signal is low-pass filtered.

8. The method of claim 1, further comprising:
generating a switch-off signal for switching off the heating element after expiration of a defined switch-on period during which the heating element is switched on.

9. The method of claim 8, further comprising:
determining the switch-on period based on a mass air flow measured by the sensor element, a starting temperature of the sensor element measured by the temperature sensor, and/or an instantaneous temperature of the sensor element measured by the temperature sensor.

10. A device for controlling a heating element to heat a sensor element of a mass air-flow sensor of a vehicle, the mass air-flow sensor including a temperature sensor for measuring a temperature of the sensor element, the device comprising a processor, wherein the processor is configured to:
evaluate a temperature profile recorded during an operation of the vehicle using the temperature sensor to identify a dew formation on the sensor element; and
generate a switch-on signal to switch on the heating element in response to the identification of the dew formation,
wherein the evaluating includes ascertaining a slope of the temperature profile, the dew formation being identified based on the slope.

11. A mass air-flow sensor system for a vehicle, the mass air-flow system comprising:
a mass air-flow sensor including a sensor element, a temperature sensor, and a heating element, wherein:
the sensor element is configured to measure a mass air-flow;
the temperature sensor is configured to measure a temperature of the sensor element;
the heating element is configured to heat the sensor element; and
a processor, wherein the processor is configured to:
evaluate a temperature profile recorded during an operation of the vehicle using the temperature sensor to identify a dew formation on the sensor element; and
generate a switch-on signal to switch on the heating element in response to the identification of the dew formation,
wherein the evaluating includes ascertaining a slope of the temperature profile, the dew formation being identified based on the slope.

12. A non-transitory computer-readable medium on which are stored instructions that are executable by a processor and that, when executed by the processor, causes the processor to perform a method for controlling a heating element to heat a sensor element of a mass air-flow sensor of a vehicle, the mass air-flow sensor including a temperature sensor for measuring a temperature of the sensor element, the method comprising:
evaluating a temperature profile recorded during an operation of the vehicle using the temperature sensor to identify a dew formation on the sensor element; and
generating a switch-on signal to switch on the heating element in response to the identification of the dew formation,
wherein the evaluating includes ascertaining a slope of the temperature profile, the dew formation being identified based on the slope.

* * * * *